United States Patent Office 3,179,624
Patented Apr. 20, 1965

3,179,624
MODIFICATION OF POLYMERIC POLYOXIMES OF POLYKETONES
Rudolph Henry Michel, Tonawanda, N.Y., assignor to E. I. du Pont de Nemours and Company, Wilmington, Del., a corporation of Delaware
No Drawing. Filed June 13, 1961, Ser. No. 116,682
7 Claims. (Cl. 260—63)

This invention relates to organic polymeric substances, and more particularly to a method for modifying the properties of polymeric polyoximes whereby to increase the potential utility thereof, and to the modified polymeric polyoximes as new compositions of matter.

While there has been recurrent interest in polymeric polyoximes, maximum utilization of these polymers had not been accomplished because they are deficient in certain properties such as tensile strength, elongation, etc., particularly desirable in shaped structures such as films, filaments, fibers, etc.

It is therefore an object of this invention to provide a simple and effective method for modifying the properties of polymeric polyoximes, particularly in such a manner as to increase the potential utility of these polymers in the form of shaped structures.

A further object is to provide polymeric polyoximes which may be employed to advantage in the form of films, filaments, fibers, etc.

A still further object is to provide a simple effective method for modifying and improving the properties of polymeric polyoximes produced by the oximation of monoolefin/carbon monoxide polymers, and particularly ethylene/carbon monoxide polymers. The foregoing and additional objects will more clearly appear from the description which follows.

These objects are fully realized by the present invention which, briefly stated, comprises interreacting as the sole reactants (1) a polymeric polyoxime in solution with (2) an acidic catalyst selected from the group consisting of phosphorus pentachloride, sulfur trioxide, and hydrogen fluoride, at a temperature and for a time below the temperature and time at which substantial degradation of the polymer occurs whereby a modified polymeric polyoxime free of acidic catalyst is obtained.

Polymeric polyoximes which may be improved by carrying out the process of this invention are those prepared by the oximation of polymeric polyketones including polymeric polyketones whose keto-carbon atoms are integral with the polymer chain as well as those derived from polymeric polyketones whose keto-carbon atoms are located in branches of the main polymer chain. Suitable polymeric polyketones are, for example, those prepared by the polymerization of alkyl alkenyl ketones, e.g., methyl vinyl ketone, ethyl allyl ketone and methyl isopropenyl ketone by procedures referred to or described by C. E. Schildknecht, in chapter XIV of "Vinyls and Related Polymers" (1952), John Wiley & sons, Inc.; by C. S. Marvel and C. L. Levesque in "The Structure of Vinyl Polymers: The Polymer From Methyl Vinyl Ketone," J. Am. Chem. Soc., 60, 280 (1938); by C. S. Marvel, A. D. Zoss and F. Grosser in "Ionic Polymerization of Some Vinyl Compounds," Ind. Eng. Chem., 41, 2891 (1949); and by procedures described in U.S. Patents 2,088,577; 2,240,730; 2,406,684; and 2,895,942. The oximation of such polymeric polyketones may be accomplished by any method known to the art, for example, by procedures generally described in the above-mentioned Marvel and Levesque reference. Because of ready availability and comparatively low cost of the raw materials from which the parent polymeric polyketones are made, a preferred class of polymeric polyketones from which to prepare polymeric polyoximes which may be improved by carrying out the process of this invention are those prepared by polymerizing a monoolefin containing from 2 to 4 carbon atoms, e.g, ethylene, propylene, isobutylene or mixtures thereof, with carbon monoxide in the presence of a polymerization catalyst. Procedures by which these polymerizations may be carried out are described in U.S. Patents 2,391,920; 2,405,950; 2,495,286; 2,519,791; and 2,641,590. Depending on polymerization conditions, including type and concentration of catalyst, reaction medium and the relative concentrations of starting materials, monoolefin/carbon monoxide polymers in which the mol ratio of monoolefin to carbon monoxide ranges from 1:1 to 150:1 may be produced. The oximation of this preferred class of polymeric polyketones to produce a class of polymeric polyoximes preferred for use with the process of this invention may be conveniently carried out, for example, by procedures generally described by M. M. Brubaker, D. D. Coffman and H. H. Hoehn in "Synthesis and Characterization of Ethylene/Carbon Monoxide Copolymers, a New Class of Polyketones," J. Am. Chem. Soc., 74, 1509 (1952), and by procedures described in U.S. Patents 2,495,286 and 2,620,325.

While phosphorus pentachloride is the preferred acidic catalyst when carrying out the process of this invention, additional acidic catalyst which may be employed in the same manner and with like effect are sulfur trioxide and hydrogen fluoride.

In carrying out the process of this invention, the initial mol ratio of acidic catalyst to oxime content of the polymeric polyoxime is usually not less than about 2:1 and preferably not less than about 3:1. Mole ratios higher than 10:1 may be employed to effect satisfactory modifications in very short reaction times. However, for commercial use, somewhat lower mol ratios which favor catalyst recovery economies are favored.

In modifying the polymeric polyoximes according to the process of this invention, the polymers may be dissolved in a suitable reaction medium, e.g., chloroform, to which solution is added a quantity of the acidic catalyst sufficient to bring about modification of the polymeric polyoxime without simultaneously so degrading the polymer that degradative effects may offset property improvements to be derived from the modification process itself. Toward this end, and particularly because the reactions of the process of this invention are exothermic, it is desirable to keep the temperature of the contents of the reaction vessel as low as can conveniently be accomplished, e.g., at or below normal room temperatures. Then too, every effort is made to keep reaction times to a minimum, rapidly "quenching" the reaction when the time elapsed has been sufficient to accomplish the desired degree of modification. Reaction times should not exceed about 1 hour, and preferably not longer than about 30 minutes. To minimize hydrolytic side effects, conditions in the reaction vessel should be maintained as nearly anhydrous as is practical and economically feasible.

In general, any organic liquid or mixture of liquids capable of dissolving the polymeric polyoximes and which do not react chemically with the polymeric polyoximes either before or after their modification or with the acidic catalysts employed may be used as the reaction medium for purposes of this invention. A preferred medium is chloroform. As examples of other media useful herein, there may be mentioned benzene, toluene, dioxane, diethyl ether, etc.

The following specific examples will serve to further illustrate the principles and practice of this invention. Parts and percentages are by weight unless otherwise indicated.

EXAMPLE 1

Preparation of polymeric polyoxime

Into a three-necked glass vessel equipped with a heating mantle, a thermometer, a condenser and mechanical stirrer was poured a solution consisting of about 118 parts of an ethylene/carbon monoxide copolymer (having an average ethylene-to-carbon monoxide mol ratio of about 11.6-to-1) dissolved in about 435 parts of toluene. To this solution was added 35 parts of hydroxylamine hydrochloride and 27 parts of sodium methoxide dissolved in 355 parts of ethanol and 25 parts of water. While stirring, the mixture was heated to a temperature in the range of 65–70° C. and maintained at this temperature with continuous stirring for about 20 hours. After cooling, the polymer was precipitated from solution by the addition of about 795 parts of methanol. After separation by filtration, washing with methanol and water and then drying under a vacuum, about 112 parts of the desired polymeric polyoxime was recovered. This polymer was purified by dissolving in toluene and reprecipitating from solution by additions of methanol. This polymeric polyoxime had an inherent viscosity in cyclohexanone of 0.25, measured at 50° C. on a 0.25% solution, and melted at about 70° C. A film was melt pressed from a portion of the polymeric polyoxime for evaluation of its physical properties.

Modification of polymeric polyoxime

Fifty parts of the purified polymeric polyoxime prepared above was dissolved in about 3750 parts of chloroform and this solution added to a three-necked glass vessel equipped with a mechanical stirrer. The glass vessel was immersed in an ice bath and, after the temperature of its contents had dropped to about 3–5° C., 400 parts of powdered phosphorus pentachloride was added, with continual stirring, over a period of about 30 minutes, during which time the temperature of the contents did not exceed 10° C. At this point the contents of the glass vessel were poured over crushed ice and washed with large amounts of water, first by decantation, then by extraction. The organic layer separated therefrom was evaporated to dryness, the polymeric solid recovered being then washed with water and dried in a vacuum. About 45 parts of polymeric solid were recovered. The recovered polymer has an inherent viscosity in cyclohexanone of 0.19, measured at 50° C. on a 0.25% solution, and melted at 85° C. A film melt-pressed from a portion of the modified polymer showed a 170% increase in tensile strength and a 50% increase in percent elongation-at-break over the film melt-pressed from the untreated polymeric polyoxime.

EXAMPLE 2

Following the procedure described in Example 1, an ethylene/carbon monoxide copolymer having an average ethylene-to-carbon monoxide mol ratio of about 8-to-1 was first converted to the corresponding polymeric polyoxime a portion of which was then modified by treatment with phosphorus pentachloride. The modified polymer exhibited a higher melting point than did the untreated polymeric polyoxime. A film melt-pressed from the modified polymer exhibited nearly twice the tensile strength and percent elongation-at-break of a film melt-pressed from the untreated polymeric polyoxime.

EXAMPLE 3

A portion of the polymeric polyoxime prepared in Example 1 was dissolved in benzene in a three-necked glass vessel equipped with a mechanical stirrer. The glass vessel was immersed in an ice bath until the temperature of its contents had dropped to about 10° C. at which time sulfur trioxide was bubbled continuously into the solution, with continual stirring, over a period of about 50 minutes, during which time the temperature of the contents did not exceed 20° C. At this point the contents of the glass vessel were poured over crushed ice and washed with large amounts of water, first by decantation, then by extraction. The organic layer separated therefrom was evaporated to dryness, the polymeric solid recovered being then washed with water and dried in a vacuum. A film melt-pressed from the recovered polymer exhibited a substantial increase in tensile strength, percent elongation-at-break and melting point over a film melt-pressed from the untreated polymeric polyoxime.

EXAMPLE 4

Following the procedure of Example 3, hydrogen fluoride was bubbled into a dioxane solution of the polymeric polyoxime prepared in Example 1 over a period of about 25 minutes, during which time the temperature of the contents of the glass vessel rose from 10° C. to about 20° C. After quenching the reaction by pouring the contents of the glass vessel over crushed ice, washing with water first by decantation and then by extractive techniques, the organic layer was separated therefrom, evaporated to dryness and the polymeric solid recovered, washed with water and dried in a vacuum. As was demonstrated in Example 3, a film melt-pressed from the recovered polymer exhibited a substantial increase in tensile strength, percent elongation-at-break and melting point over a film melt-pressed from the untreated polymeric polyoxime.

Following the procedures set forth above with specific reference to oximated copolymer of ethylene and carbon monoxide as the polymeric polyoxime, and phosphorus pentachloride as the acidic catalyst substantial improvements in tensile strength, percent elongation-at-break, melting point, etc. are obtained when other polymeric polyoximes such as that prepared by the oximation of polyvinyl methyl ketone are substituted for the polyoxime of ethylene/carbon monoxide copolymers, and other acidic catalysts such as sulfur trioxide and hydrogen fluoride are substituted for the preferred phosphorus pentachloride.

It is evident from the foregoing description and examples that the present invention provides a simple, economical, and altogether practical process for modifying polymeric polyoximes whereby to enhance properties of the polymers and greatly increase their field of usefulness.

I claim:

1. The process which comprises reacting, as the sole reactants (1) a polymeric polyoxime prepared by the oximation of a polymeric polyketone dissolved in a solvent for said polymeric polyoxime, with (2) an acidic catalyst selected from the group consisting of phosphorus pentachloride, sulfur trioxide and hydrogen fluoride at a temperature and for a time below the temperature and time at which substantial degradation of the polymer occurs and a modified polymeric polyoxime free of acidic catalyst and having a tensile strength and percent elongation-to-break substantially higher than that of the unmodified polymeric polyoxime is obtained.

2. The process of claim 1 wherein said acidic catalyst is phosphorus pentachloride.

3. The process of claim 1 wherein said solvent is chloroform.

4. The process of claim 1 wherein the polymeric polyoxime is a polyoxime of a monoolefin/carbon monoxide copolymer, said monoolefin containing from 2 to 4 carbon atoms inclusive.

5. The process of claim 4 wherein the polymeric polyoxime is a polyoxime of ethylene/carbon monoxide copolymer.

6. The process of claim 5 wherein the acidic catalyst is phosphorus pentachloride.

7. The process of claim 6 wherein the solvent is chloroform.

(References on following page)

References Cited by the Examiner

UNITED STATES PATENTS 2,620,325 12/52 Langkammerer _____ 260—63
2,985,610 5/61 Blanchette et al. _____ 260—63
3,068,201 12/62 Michel _____ 260—63

OTHER REFERENCES

Journal American Chemical Society, 67, pages 1941–3, 1945.

LEON J. BERCOVITZ, *Primary Examiner.*
H. N. BURSTEIN, *Examiner.*